(12) United States Patent
Zhu et al.

(10) Patent No.: US 12,081,018 B2
(45) Date of Patent: Sep. 3, 2024

(54) ELECTROSTATIC DISCHARGE PROTECTION NETWORK FOR CHIP

(71) Applicant: CHANGXIN MEMORY TECHNOLOGIES, INC., Hefei (CN)

(72) Inventors: Ling Zhu, Hefei (CN); Kai Tian, Hefei (CN)

(73) Assignee: CHANGXIN MEMORY TECHNOLOGIES, INC., Hefei (CN)

( * ) Notice: Subject to any disclaimer, the term of this patent is extended or adjusted under 35 U.S.C. 154(b) by 197 days.

(21) Appl. No.: 17/807,261

(22) Filed: Jun. 16, 2022

(65) Prior Publication Data
US 2023/0009631 A1    Jan. 12, 2023

Related U.S. Application Data

(63) Continuation of application No. PCT/CN2022/088746, filed on Apr. 24, 2022.

(30) Foreign Application Priority Data

Jul. 9, 2021    (CN) .......................... 202110780750.5

(51) Int. Cl.
    *H02H 9/04*    (2006.01)
(52) U.S. Cl.
    CPC .................................. *H02H 9/046* (2013.01)
(58) Field of Classification Search
    CPC ........................................................ H02H 9/046
    (Continued)

(56) References Cited

U.S. PATENT DOCUMENTS 5,034,845 A * 7/1991 Murakami ............. H02H 9/046
                                                      361/111
5,596,474 A * 1/1997 Wada .................. H01L 27/0251
                                                      361/111
(Continued)

FOREIGN PATENT DOCUMENTS

CN    101884103 A    11/2010
CN    105977938 A     9/2016
(Continued)

OTHER PUBLICATIONS

International Search Report cited in PCT/CN2022/088746 mailed Jul. 1, 2022, 9 pages.

*Primary Examiner* — Dharti H Patel
(74) *Attorney, Agent, or Firm* — Kilpatrick Townsend & Stockton LLP

(57) ABSTRACT

The present disclosure provides an electrostatic discharge (ESD) protection network for a chip. The chip includes a first power supply pad, a second power supply pad, and a ground pad. The ESD protection network includes: a first ESD protection circuit, located between the first power supply pad and the ground pad, and configured to discharge an electrostatic charge when there is an ESD pulse caused by the electrostatic charge on the first power supply pad; a second ESD protection circuit, located between the second power supply pad and the ground pad, and configured to discharge an electrostatic charge when there is an ESD pulse caused by the electrostatic charge on the second power supply pad; and a third ESD protection circuit, configured to provide a discharge path for an electrostatic charge between the first power supply pad and the second power supply pad.

15 Claims, 2 Drawing Sheets

(58) Field of Classification Search
USPC .......................................................... 361/56
See application file for complete search history.

(56) References Cited

U.S. PATENT DOCUMENTS

| | | | | | |
|---|---|---|---|---|---|
| 5,740,000 | A * | 4/1998 | Stackhouse | ............ | H02H 9/046 |
| | | | | | 361/111 |
| 5,991,135 | A * | 11/1999 | Saleh | ....................... | H01L 23/60 |
| | | | | | 361/111 |
| 6,144,542 | A * | 11/2000 | Ker | ...................... | H01L 27/0251 |
| | | | | | 361/111 |
| 6,927,957 | B1 * | 8/2005 | Bakulin | .............. | H01L 27/0259 |
| | | | | | 361/56 |
| 8,068,319 | B1 * | 11/2011 | Chan | ................... | H01L 27/0292 |
| | | | | | 361/111 |
| 8,194,373 | B2 * | 6/2012 | Padden | ............... | H01L 27/0251 |
| | | | | | 361/118 |
| 9,172,242 | B2 * | 10/2015 | Chang | ..................... | H02H 9/046 |
| 10,069,297 | B2 * | 9/2018 | Haruki | ................... | H02H 9/046 |
| 10,879,232 | B2 * | 12/2020 | Lai | ....................... | H01L 27/0266 |
| 10,971,929 | B2 | 4/2021 | Wang et al. | | |
| 11,398,469 | B1 * | 7/2022 | Karp | ...................... | H01L 25/0657 |
| 11,791,625 | B2 * | 10/2023 | Xu | ...................... | H01L 27/0288 |
| | | | | | 361/56 |
| 2003/0039084 | A1 * | 2/2003 | Hatzilambrou | ..... | H01L 27/0292 |
| | | | | | 361/56 |
| 2005/0270712 | A1 * | 12/2005 | Huang | ................. | H01L 27/0292 |
| | | | | | 361/90 |
| 2005/0286186 | A1 * | 12/2005 | Chang | ................. | H01L 27/0292 |
| | | | | | 361/56 |
| 2007/0091523 | A1 * | 4/2007 | Chen | .................... | H01L 27/0292 |
| | | | | | 361/56 |
| 2008/0080107 | A1 * | 4/2008 | Chow | ................. | H01L 27/0251 |
| | | | | | 361/56 |
| 2008/0106834 | A1 | 5/2008 | Hung | | |
| 2012/0182654 | A1 * | 7/2012 | Wang | ..................... | H02H 9/046 |
| | | | | | 361/56 |
| 2013/0027821 | A1 * | 1/2013 | Chen | ................... | H02H 9/046 |
| | | | | | 361/56 |
| 2014/0126089 | A1 * | 5/2014 | Chang | ................... | H02H 9/046 |
| | | | | | 361/56 |
| 2014/0293492 | A1 * | 10/2014 | Tatsumi | .................. | H02H 9/046 |
| | | | | | 361/56 |
| 2014/0307354 | A1 * | 10/2014 | Watanabe | .............. | H02H 9/046 |
| | | | | | 361/56 |
| 2015/0311700 | A1 * | 10/2015 | Lee | ......................... | H02H 9/04 |
| | | | | | 361/56 |
| 2020/0035670 | A1 * | 1/2020 | Tsai | ...................... | H02H 9/046 |

FOREIGN PATENT DOCUMENTS

| | | | | |
|---|---|---|---|---|
| CN | 106158850 A | * | 11/2016 | ......... H01L 27/0255 |
| CN | 112448378 A | | 3/2021 | |
| CN | 112968437 A | | 6/2021 | |

\* cited by examiner

ELECTROSTATIC DISCHARGE PROTECTION NETWORK FOR CHIP

CROSS-REFERENCE TO RELATED APPLICATIONS

This is a continuation of International Application No. PCT/CN2022/088746, filed on Apr. 24, 2022, which claims the priority to Chinese Patent Application No. 202110780750.5, titled "ELECTROSTATIC DISCHARGE PROTECTION NETWORK FOR CHIP" and filed with the China National Intellectual Property Administration (CNIPA) on Jul. 9, 2021. The entire contents of International Application No. PCT/CN2022/088746 and Chinese Patent Application No. 202110780750.5 are incorporated herein by reference.

TECHNICAL FIELD

The present disclosure relates to the technical field of integrated circuits, and in particular, to an electrostatic discharge (ESD) protection network for a chip.

BACKGROUND

Static electricity is everywhere. Without an ESD protection circuit, a chip will soon be damaged, and almost fatally damaged, by static electricity introduced due to various reasons.

Therefore, a chip is usually provided with an ESD protection circuit, which is used to discharge electrostatic charges in a timely manner, to prevent a protected circuit from failing or even burning due to a high voltage caused by the electrostatic charges.

SUMMARY

The present disclosure provides an electrostatic discharge protection network for a chip. The chip includes a first power supply pad, a second power supply pad, and a ground pad. The electrostatic discharge protection network includes:

a first electrostatic discharge protection circuit, located between the first power supply pad and the ground pad, and configured to discharge an electrostatic charge when there is an electrostatic discharge pulse caused by the electrostatic charge on the first power supply pad;

a second electrostatic discharge protection circuit, located between the second power supply pad and the ground pad, and configured to discharge an electrostatic charge when there is an electrostatic discharge pulse caused by the electrostatic charge on the second power supply pad; and a third electrostatic discharge protection circuit, located between the first power supply pad and the second power supply pad, and configured to provide a discharge path for an electrostatic charge between the first power supply pad and the second power supply pad.

BRIEF DESCRIPTION OF THE DRAWINGS

The accompanying drawings incorporated into the specification and constituting part of the specification illustrate the embodiments of the present disclosure, and serve, together with the specification, to explain the principles of the present disclosure.

Specific embodiments of the present application are shown by using the accompanying drawings and are described below in more detail. The accompanying drawings and text description are not intended to limit the scope of the concept of the present application in any manner, but to explain the concept of the present application for those skilled in the art with reference to specific embodiments.

DETAILED DESCRIPTION

Exemplary embodiments are described in detail herein, and examples thereof are represented in the accompanying drawings. When the following descriptions relate to the accompanying drawings, unless otherwise stated, same numerals in different accompanying drawings represent same or similar elements. Implementations described in the following exemplary embodiments do not represent all implementations consistent with the present disclosure. On the contrary, the implementations are merely examples of apparatuses and methods that are described in detail in the appended claims and consistent with some aspects of the present disclosure.

Those skilled in the art may easily figure out other implementation solutions of the present disclosure after considering the specification and practicing the invention disclosed herein. The present disclosure is intended to cover any variations, purposes or applicable changes of the present disclosure. Such variations, purposes or applicable changes follow the general principle of the present disclosure and include common knowledge or conventional technical means in the technical field which is not disclosed in the present disclosure. The specification and embodiments are merely considered as illustrative, and the real scope and spirit of the present disclosure are pointed out by the appended claims.

Figure 1:
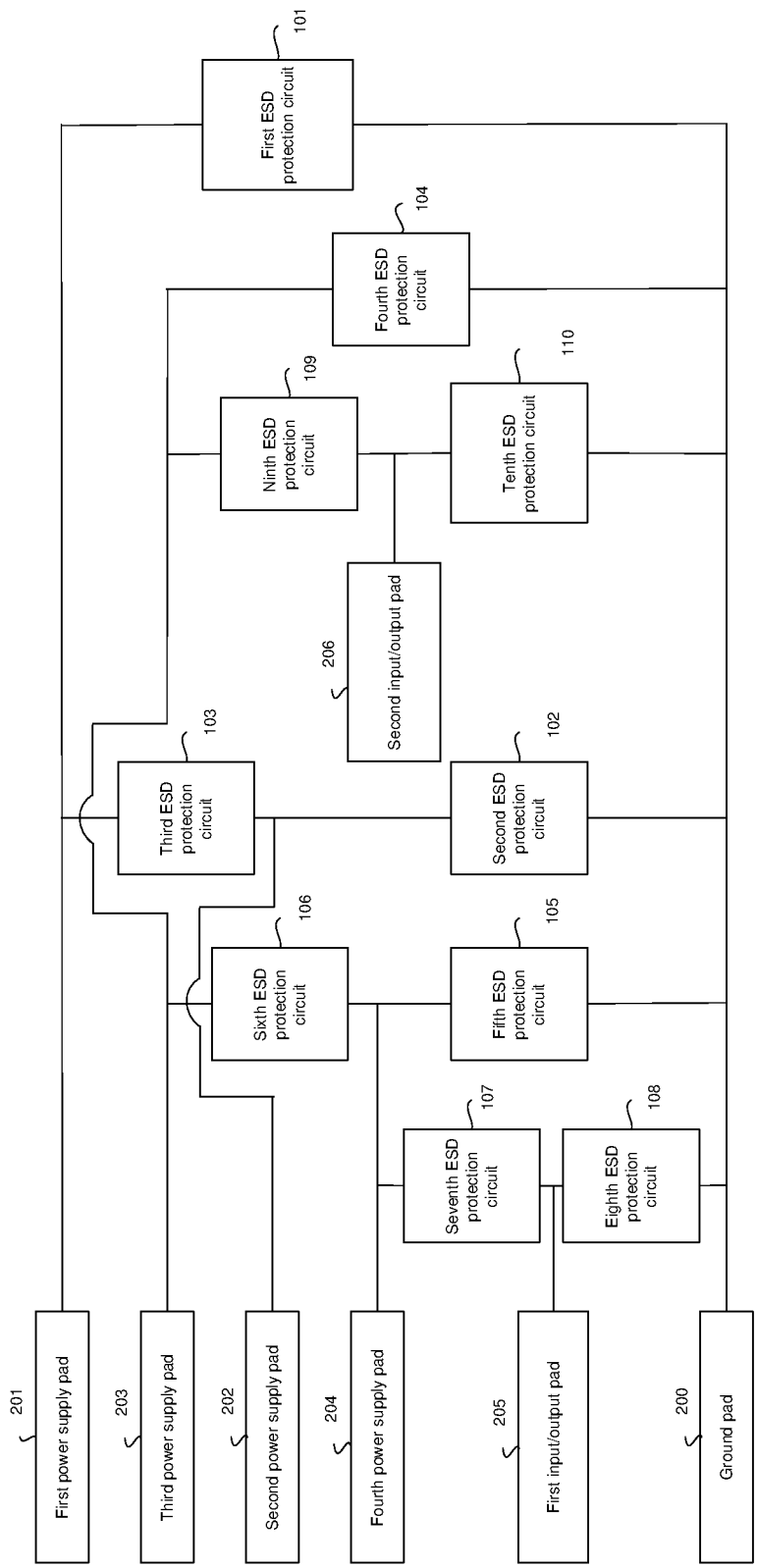
FIG. 1 is a structural block diagram of an ESD protection network for a chip according to one embodiment of the present disclosure.

As shown in FIG. 1, one embodiment of the present disclosure provides an ESD protection network for a chip. The chip includes a first power supply pad 201 connected to a first power supply terminal, a second power supply pad 202 connected to a second power supply terminal, and a ground pad 200 connected to a ground terminal.

The ESD protection network includes a first ESD protection circuit 101, a second ESD protection circuit 102, and a third ESD protection circuit 103. The first ESD protection circuit 101 is located between the first power supply pad 201 and the ground pad 200, the second ESD protection circuit 102 is located between the second power supply pad 202 and the ground pad 200, and the third ESD protection circuit 103 is located between the first power supply pad 201 and the second power supply pad 202.

The first ESD protection circuit 101 is configured to discharge an electrostatic charge when there is an ESD pulse caused by the electrostatic charge on the first power supply pad 201, the second ESD protection circuit 102 is configured to discharge an electrostatic charge when there is an ESD pulse caused by the electrostatic charge on the second power supply pad 202, and the third ESD protection circuit 103 is configured to provide a discharge path for an electrostatic charge between the first power supply pad 201 and the second power supply pad 202.

When there is an ESD pulse on the first power supply pad 201, the electrostatic charge is discharged to the ground pad 200 through the first ESD protection circuit 101, and can also be discharged to the ground pad 200 through the third ESD protection circuit 103 and the second ESD protection circuit 102.

When there is an ESD pulse on the second power supply pad 202, the electrostatic charge is discharged to the ground pad 200 through the second ESD protection circuit 102, and can also be discharged to the ground pad 200 through the third ESD protection circuit 103 and the first ESD protection circuit 101.

Generally, an internal circuit of the chip connected to a power supply pad having a smaller power supply terminal voltage has weaker breakdown resistance, which can strengthen a capability of ESD protection of the connected power supply pad having a smaller power supply terminal voltage.

In one embodiment, if a voltage of a first power supply terminal connected to the first power supply pad 201 is greater than a voltage of a second power supply terminal connected to the second power supply pad 202, the third ESD protection circuit 103 provides a discharge path for an electrostatic charge from the second power supply pad 202 to the first power supply pad 201.

If the voltage of the first power supply terminal connected to the first power supply pad 201 is less than the voltage of the second power supply terminal connected to the second power supply pad 202, the third ESD protection circuit 103 provides a discharge path for an electrostatic charge from the first power supply pad 201 to the second power supply pad 202.

Through such settings, the structure of the third ESD protection circuit 103 can be simplified, and the reliability of the ESD protection network can be improved.

In one embodiment, the first ESD protection circuit 101 includes a first drive unit connected between the first power supply pad 201 and the ground pad 200, and a first discharge transistor provided with a control terminal connected to the first drive unit, a first terminal connected to the first power supply pad 201, and a second terminal connected to the ground pad 200.

The first drive unit is configured to generate a first control signal according to the ESD pulse, and the first discharge transistor is configured to be turned on under the control of the first control signal, so as to discharge the electrostatic charge on the first power supply pad 201 to the ground pad 200.

In one embodiment, the second ESD protection circuit 102 includes a second drive unit connected between the second power supply pad 202 and the ground pad 200, and a second discharge transistor provided with a control terminal connected to the second drive unit, a first terminal connected to the second power supply pad 202, and a second terminal connected to the ground pad 200.

The second drive unit is configured to generate a second control signal according to the ESD pulse, and the second discharge transistor is configured to be turned on under the control of the second control signal, so as to discharge the electrostatic charge on the second power supply pad 202 to the ground pad 200.

In one embodiment, the second ESD protection circuit 102 further includes a first diode provided with an anode connected to the ground pad 200 and a cathode connected to the second power supply pad 202 and configured to discharge the electrostatic charge when there is an ESD pulse on the ground pad 200.

In one embodiment, the third ESD protection circuit 103 includes a second diode. If the voltage of the first power supply terminal connected to the first power supply pad 201 is greater than the voltage of the second power supply terminal connected to the second power supply pad 202, an anode of the second diode is connected to the second power supply pad 202, and a cathode of the second diode is connected to the first power supply pad 201, so that when there is an ESD pulse on the second power supply pad 202, the electrostatic charge is discharged to the first power supply pad 201 through the second diode, and the ESD pulse on the first power supply pad 201 is discharged to the ground pad 200 through the first ESD protection circuit 101.

In one embodiment, if the voltage of the first power supply terminal connected to the first power supply pad 201 is less than the voltage of the second power supply terminal connected to the second power supply pad 202, the anode of the second diode is connected to the first power supply pad 201, and the cathode of the second diode is connected to the second power supply pad 202, so that when there is an ESD pulse on the first power supply pad 201, the electrostatic charge is discharged to the second power supply pad 202 through the second diode, and the ESD pulse on the second power supply pad 202 is discharged to the ground pad 200 through the second ESD protection circuit 102.

By providing the second diode between the first power supply pad 201 and the second power supply pad 202, and determining a connection relationship of the second diode according to the voltage of the power supply terminal connected to the first power supply pad 201 and the voltage of the power supply terminal connected to the second power supply pad 202, the capability of ESD protection on the power supply pad corresponding to the provided power supply terminal having a smaller voltage can be improved, thereby improving the capability of ESD protection for a chip.

In one embodiment, the chip further includes a third power supply pad 203 connected to a third power supply terminal, and a fourth power supply pad 204 connected to a fourth power supply terminal.

The ESD protection network includes a fourth ESD protection circuit 104, a fifth ESD protection circuit 105, and a sixth ESD protection circuit 106. The fourth ESD protection circuit 104 is located between the third power supply pad 203 and the ground pad 200, the fifth ESD protection circuit 105 is located between the fourth power supply pad 204 and the ground pad 200, and the sixth ESD protection circuit 106 is located between the third power supply pad 203 and the fourth power supply pad 204.

The fourth ESD protection circuit 104 is configured to discharge an electrostatic charge when there is an ESD pulse caused by the electrostatic charge on the third power supply pad 203, the fifth ESD protection circuit 105 is configured to discharge an electrostatic charge when there is an ESD pulse caused by the electrostatic charge on the fourth power supply pad 204, and the sixth ESD protection circuit 106 is configured to provide a discharge path for an electrostatic charge between the third power supply pad 203 and the fourth power supply pad 204.

When there is an ESD pulse on the third power supply pad 203, the electrostatic charge is discharged to the ground pad 200 through the fourth ESD protection circuit 104, and can also be discharged to the ground pad 200 through the sixth ESD protection circuit 106 and the fifth ESD protection circuit 105.

When there is an ESD pulse on the fourth power supply pad 204, the electrostatic charge is discharged to the ground pad 200 through the fifth ESD protection circuit 105, and can also be discharged to the ground pad 200 through the sixth ESD protection circuit 106 and the fourth ESD protection circuit 104.

Generally, an internal circuit of the chip connected to a power supply pad corresponding to a power supply terminal having a smaller voltage has weaker breakdown resistance, which can strengthen a capability of ESD protection of the power supply pad corresponding to the power supply terminal having a smaller voltage.

In one embodiment, if a voltage of a third power supply terminal connected to the third power supply pad 203 is greater than a voltage of a fourth power supply terminal connected to the fourth power supply pad 204, the sixth ESD protection circuit 106 provides a discharge path for an electrostatic charge from the fourth power supply pad 204 to the third power supply pad 203.

If the voltage of the third power supply terminal connected to the third power supply pad 203 is less than the voltage of the fourth power supply terminal connected to the fourth power supply pad 204, the sixth ESD protection circuit 106 provides a discharge path for an electrostatic charge from the third power supply pad 203 to the fourth power supply pad 204.

Through such settings, the structure of the sixth ESD protection circuit 106 can be simplified, and the reliability of the ESD protection network can be improved.

In one embodiment, the fourth ESD protection circuit 104 includes a third drive unit connected between the third power supply pad 203 and the ground pad 200, and a third discharge transistor provided with a first terminal connected to the third power supply pad 203, a second terminal connected to the ground pad 200, and a control terminal connected to the third drive unit.

The third drive unit is configured to generate a third control signal according to the ESD pulse, and the third discharge transistor is configured to be turned on under the control of the third control signal, so as to discharge the electrostatic charge on the third power supply pad 203 to the ground pad 200.

In one embodiment, the fifth ESD protection circuit 105 includes a fourth drive unit connected between the fourth power supply pad 204 and the ground pad 200, and a fourth discharge transistor provided with a first terminal connected to the fourth power supply pad 204, a second terminal connected to the ground pad 200, and a control terminal connected to the fourth drive unit.

The fourth drive unit is configured to generate a fourth control signal according to the ESD pulse, and the fourth discharge transistor is configured to be turned on under the control of the fourth control signal, so as to discharge the electrostatic charge on the fourth power supply pad 204 to the ground pad 200.

In one embodiment, the sixth ESD protection circuit 106 includes a third diode. If the voltage of the third power supply terminal connected to the third power supply pad 203 is greater than the voltage of the fourth power supply terminal connected to the fourth power supply pad 204, an anode of the third diode is connected to the fourth power supply pad 204, and a cathode of the third diode is connected to the third power supply pad 203, so that when there is an ESD pulse on the fourth power supply pad 204, the electrostatic charge is discharged to the third power supply pad 203 through the third diode, and the ESD pulse on the third power supply pad 203 is discharged to the ground pad 200 through the fourth ESD protection circuit 104.

In one embodiment, if the voltage of the third power supply terminal connected to the third power supply pad 203 is less than the voltage of the fourth power supply terminal connected to the fourth power supply pad 204, the anode of the third diode is connected to the third power supply pad 203, and the cathode of the third diode is connected to the fourth power supply pad 204, so that when there is an ESD pulse on the third power supply pad 203, the electrostatic charge is discharged to the fourth power supply pad 204 through the third diode, and the ESD pulse on the fourth power supply pad 204 is discharged to the ground pad 200 through the fifth ESD protection circuit 105.

By providing the third diode between the third power supply pad 203 and the fourth power supply pad 204, and determining a connection relationship of the third diode according to the voltage of the power supply terminal connected to the third power supply pad 203 and the voltage of the power supply terminal connected to the fourth power supply pad 204, the capability of ESD protection on the power supply pad having a smaller voltage can be improved, thereby improving the capability of ESD protection for a chip.

In one embodiment, the chip further includes a first input/output pad 205. The ESD protection network further includes a seventh ESD protection circuit 107 connected between the first input/output pad 205 and the fourth power supply pad 204, and an eighth ESD protection circuit 108 connected between the first input/output pad 205 and the ground pad 200.

The seventh ESD protection circuit 107 is configured to discharge the electrostatic charge when there is an ESD pulse on the first input/output pad 205. More specifically, the seventh ESD protection circuit 107 is configured to discharge the electrostatic charge to the fourth power supply pad 204 when there is an ESD pulse on the first input/output pad 205. The ESD pulse on the fourth power supply pad 204 is discharged to the ground pad 200 through the fifth ESD protection circuit 105, or is discharged to the ground pad 200 through the sixth ESD protection circuit 106 and the fourth ESD protection circuit 104.

The eighth ESD protection circuit 108 is configured to discharge the electrostatic charge when there is an ESD pulse on the ground pad 200. More specifically, the eighth ESD protection circuit 108 is configured to discharge the electrostatic charge to the first input/output pad 205 when there is an ESD pulse on the ground pad 200, and the electrostatic charge is discharged to the fourth power supply pad 204 through the seventh ESD protection circuit 107 and then flows back to the ground pad 200 through the fifth ESD protection circuit 105. Or, the ESD pulse on the fourth power supply pad 204 is discharged to the ground pad 200 through the sixth ESD protection circuit 106 and the fourth ESD protection circuit 104 to form a discharge loop.

The ESD pulse on the ground pad is discharged to the first input/output pad 205 by providing the seventh ESD protection circuit 107 between the first input/output pad 205 and the fourth power supply pad 204 and providing the eighth ESD protection circuit 108 between the ground pad 200 and the first input/output pad 205, and the ESD pulse on the first input/output pad 205 is discharged to the fourth power supply pad 204 and discharged to the ground pad 200 through the fifth ESD protection circuit 105, thereby simplifying the structure of the ESD protection network, and improving the network of the ESD protection network.

In one embodiment, the chip further includes a second input/output pad 206. The ESD protection network further includes a ninth ESD protection circuit 109 connected between the second input/output pad 206 and the third power supply pad 203, and a tenth ESD protection circuit 110 connected between the second input/output pad 206 and the ground pad 200.

The ninth ESD protection circuit 109 is configured to discharge the electrostatic charge when there is an ESD pulse on the second input/output pad 206. More specifically, the ninth ESD protection circuit 109 is configured to discharge the electrostatic charge to the third power supply pad 203 when there is an ESD pulse on the second input/output pad 206. The ESD pulse on the third power supply pad 203 is discharged to the ground pad 200 through the fourth ESD protection circuit 104, or is discharged to the ground pad 200 through the sixth ESD protection circuit 106 and the fifth ESD protection circuit 105.

The tenth ESD protection circuit 110 is configured to discharge the electrostatic charge when there is an ESD pulse on the ground pad 200. More specifically, the tenth ESD protection circuit 110 is configured to discharge the electrostatic charge to the second input/output pad 206 when there is an ESD pulse on the ground pad 200, and the electrostatic charge is discharged to the third power supply pad 203 through the ninth ESD protection circuit 109 and then flows back to the ground pad 200 through the fourth ESD protection circuit 104. Or, the ESD pulse on the third power supply pad 203 is discharged to the ground pad 200 through the sixth ESD protection circuit 106 and the fifth ESD protection circuit 105 to form a discharge loop.

The ESD pulse on the ground pad is discharged to the second input/output pad 206 by providing the ninth ESD protection circuit 109 between the second input/output pad 206 and the third power supply pad 203 and providing the tenth ESD protection circuit 110 between the ground pad 200 and the second input/output pad 206, and the ESD pulse on the second input/output pad 206 is discharged to the third power supply pad 203 and discharged to the ground pad 200 through the fourth ESD protection circuit 104, thereby simplifying the structure of the ESD protection network, and improving the network of the ESD protection network.

Figure 2:
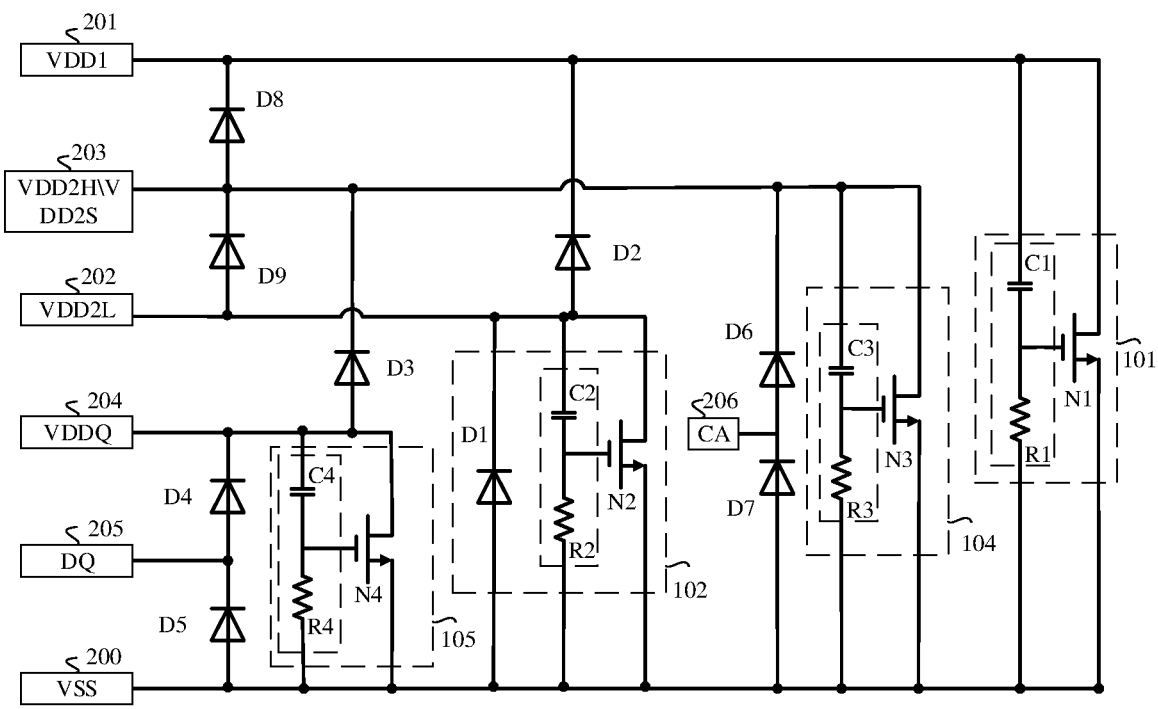
FIG. 2 is a circuit diagram of an ESD protection network for a chip according to one embodiment of the present disclosure.

As shown in FIG. 2, the chip is provided with a plurality of first power supply pads VDD1, a plurality of second power supply pads VDD2L, a plurality of third power supply pads VDD2H\VDD2HS, a plurality of fourth power supply pads VDDQ, and a ground pad VSS. The first power supply pads VDD1 are connected to the first power supply terminal, the second power supply pads VDD2L are connected to the second power supply terminal, the third power supply pads VDD2H\VDD2HS are connected to the third power supply terminal, and the fourth power supply pads VDDQ are connected to the fourth power supply terminal.

In one embodiment, the voltage of the first power supply terminal is greater than the voltage of the third power supply terminal, the voltage of the third power supply terminal is greater than the voltage of the second power supply terminal, and the voltage of the second power supply terminal is greater than the voltage of the fourth power supply terminal. The ground pad VSS is connected to the ground terminal.

In one embodiment, an amplitude of the first power supply terminal is 1.8 V, an amplitude of the second power supply terminal is 0.9 V, an amplitude of the third power supply terminal is 1.05 V, and an amplitude of the fourth power supply terminal is 0.5 V or 0.3 V.

The chip is also provided with a first input/output pad DQ and a second input/output pad CA, both configured to receive an input signal.

One embodiment of the present disclosure provides an ESD protection network for a chip, including a first ESD protection circuit 101, a second ESD protection circuit 102, a third ESD protection circuit 103, a fourth ESD protection circuit 104, a fifth ESD protection circuit 105, a sixth ESD protection circuit 106, a seventh ESD protection circuit 107, an eighth ESD protection circuit 108, a ninth ESD protection circuit 109, and a tenth ESD protection circuit 110.

In one embodiment, the first ESD protection circuit 101 includes a first drive unit and a first discharge transistor N1, where the first drive unit includes a first capacitor C1 and a first resistor R1. The first capacitor is provided with a first terminal connected to the first power supply pads VDD1, and a second terminal successively connected to a first terminal of the first resistor R1 and a control terminal of the first discharge transistor N1. A second terminal of the first resistor R1 is connected to the ground pad VSS. The first discharge transistor N1 is provided with a first terminal connected to the first power supply pads VDD1 and a second terminal connected to the ground pad VSS.

When there is an ESD pulse on the first power supply pads VDD1, an impedance of the first capacitor C1 decreases, a voltage at the first terminal of the first resistor R1 increases, the first drive circuit outputs a high level, and the high level controls the first discharge transistor N1 to be turned on, so as to discharge the electrostatic charge on the first power supply pads VDD1 to the ground pad VSS.

In one embodiment, the second ESD protection circuit 102 includes a second drive unit, a second discharge transistor N2, and a first diode D1, where the second drive unit includes a second capacitor C2 and a second resistor R2. The second capacitor C2 is provided with a first terminal connected to the second power supply pads VDD2L, and a second terminal successively connected to a first terminal of the second resistor R2 and a control terminal of the second discharge transistor N2. A second terminal of the second resistor R2 is connected to the ground pad VSS. The second discharge transistor N2 is provided with a first terminal connected to the second power supply pads VDD2L and a second terminal connected to the ground pad VSS.

When there is an ESD pulse on the second power supply pads VDD2L, an impedance of the second capacitor C2 decreases, a voltage at the first terminal of the second resistor R2 increases, the first drive circuit outputs a high level, and the high level controls the second discharge transistor N2 to be turned on, so as to discharge the electrostatic charge on the second power supply pads VDD2L to the ground pad VSS.

The first diode D1 is provided with an anode connected to the ground pad VSS and a cathode connected to the first power supply pads VDD1, and configured to discharge an electrostatic charge to the second power supply pads VDD2L when there is an electrostatic charge on the ground pad VSS. And the electrostatic charge is discharged to the ground pad VSS through the second discharge transistor N2 to form a discharge loop.

In one embodiment, the third ESD protection circuit 103 includes a second diode D2. The second diode D2 is provided with an anode connected to the second power supply pads VDD2L and a cathode connected to the first power supply pads VDD1, so as to discharge the electrostatic discharge to the first power supply pads VDD1 through the second diode D2 when there is an ESD pulse on the second power supply pads VDD2L. The ESD pulse on the first power supply pads VDD1 is discharged to the ground pad VSS through the first ESD protection circuit 101.

Through such settings, the first diode D1 and the second diode D2 provide a discharge path between the ground pad VSS and each first power supply pad VDD1, and the first ESD protection circuit 101 provides a discharge path between each first power supply pad VDD1 and the ground pad VSS, so that a voltage drop between each first power supply pad VDD1 and the ground pad VSS can be clamped at 2Vt+R*I, thereby reducing said voltage drop, and the capability of ESD protection for the second power supply pads VDD2L can be improved, thereby improving the capability of ESD protection for the chip. Vt represents a voltage drop of the diodes, R represents a parasitic resistance on a discharge path of the first diode D1 and the second diode D2, and I represents a current on the discharge path of the first diode D1 and the second diode D2.

In one embodiment, a capacitance value of the second capacitor C2 is the same as a capacitance value of the first capacitor C1, a resistance value of the second resistor R2 is the same as a resistance value of the first resistor R1, a type of the second discharge transistor N2 is the same as a type of the first discharge transistor N1, and a size of the second discharge transistor N2 is also the same as a size of the first discharge transistor N1. Through such settings, the layout of two discharge transistors, two capacitors, and two inductors is facilitated, and a manufacturing process is simplified.

In one embodiment, the fourth ESD protection circuit 104 includes a third drive unit and a third discharge transistor N3. The third drive unit includes a third capacitor C3 and a third resistor R3. The third capacitor C3 is provided with a first terminal connected to the third power supply pads VDD2H\VDD2HS, and a second terminal successively connected to a first terminal of the third resistor R3 and a control terminal of the third discharge transistor N3. A second terminal of the third resistor R3 is connected to the ground pad VSS. The third discharge transistor N3 is provided with a first terminal connected to the third power supply pads VDD2H\VDD2HS and a second terminal connected to the ground pad VSS.

When there is an ESD pulse on the third power supply pads VDD2H\VDD2HS, an impedance of the third capacitor C3 decreases, a voltage at the first terminal of the third resistor R3 increases, the third drive circuit outputs a high level, and the high level controls the third discharge transistor N3 to be turned on, so as to discharge the electrostatic charge on the third power supply pads VDD2H\VDD2HS to the ground pad VSS.

In one embodiment, the fifth ESD protection circuit 105 includes a fourth drive unit and a fourth discharge transistor N4. The fourth drive unit includes a fourth capacitor C4 and a fourth resistor R4. The fourth capacitor C4 is provided with a first terminal connected to the fourth power supply pads VDDQ, and a second terminal successively connected to a first terminal of the fourth resistor R4 and a control terminal of the fourth discharge transistor N4. A second terminal of the fourth resistor R4 is connected to the ground pad VSS. The fourth discharge transistor N4 is provided with a first terminal connected to the fourth power supply pads VDDQ and a second terminal connected to the ground pad VSS.

When there is an ESD pulse on the fourth power supply pads VDDQ, an impedance of the fourth capacitor C4 decreases, a voltage at the first terminal of the fourth resistor R4 increases, the fourth drive circuit outputs a high level, and the high level controls the fourth discharge transistor N4 to be turned on, so as to discharge the electrostatic charge on the fourth power supply pads VDDQ to the ground pad VSS.

In one embodiment, the capacitance value of the third capacitor C3 is the same as the capacitance value of the fourth capacitor C4, the resistance value of the third resistor R3 is the same as the resistance value of the fourth resistor R4, the type of the third discharge transistor N3 is the same as the type of the fourth discharge transistor N4, and the size of the third discharge transistor N3 is also the same as the size of the fourth discharge transistor N4. Through such settings, the layout of two discharge transistors, two capacitors, and two inductors is facilitated, and a manufacturing process is simplified.

In one embodiment, the voltage of the third power supply terminal connected to the third power supply pads VDD2H\VDD2HS is greater than the voltage of the fourth power supply terminal connected to the fourth power supply pads VDDQ. The sixth ESD protection circuit 106 includes a third diode D3. The third diode D3 is provided with an anode connected to the fourth power supply pads VDDQ and a cathode connected to the third power supply pads VDD2H\VDD2HS, so as to discharge the electrostatic charge to the third power supply pads VDD2H\VDD2HS through the third diode D3 when there is an ESD pulse on the fourth power supply pads VDDQ. The ESD pulse on the third power supply pads VDD2H\VDD2HS is discharged to the ground pad VSS through the fourth ESD protection circuit 104. A voltage drop between each third power supply pad VDD2H\VDD2HS and each fourth power supply pad VDDQ can be clamped at 2Vt+R*I, thereby reducing said voltage drop, and the capability of ESD protection for the fourth power supply pads VDDQ can be improved, thereby improving the capability of ESD protection for the chip.

In one embodiment, the seventh ESD protection circuit 107 further includes a fourth diode D4. The fourth diode D4 is provided with an anode connected to the first input/output pad DQ and a cathode connected to the fourth power supply pads VDDQ, and is configured to discharge the electrostatic charge to the fourth power supply pads VDDQ when there is an ESD pulse on the first input/output pad DQ.

In one embodiment, the eighth ESD protection circuit 108 includes a fifth diode D5. The fifth diode D5 is provided with a cathode connected to the first input/output pad DQ and an anode connected to the ground pad VSS, and is configured to discharge the electrostatic charge to the first input/output pad DQ when there is an ESD pulse on the ground pad VSS, so as to form a discharge loop among the ground pad VSS, the first input/output pad DQ, and the fourth power supply pads VDDQ, thereby improving the capability of ESD protection for the chip.

In one embodiment, the ninth ESD protection circuit 109 includes a sixth diode D6. The sixth diode D6 is provided with an anode connected to the second input/output pad CA and a cathode connected to the third power supply pads VDD2H\VDD2HS, and is configured to discharge the electrostatic charge to the third power supply pads VDD2H\VDD2HS when there is an ESD pulse on the second input/output pad CA.

In one embodiment, the tenth ESD protection circuit 110 includes a seventh diode D7. The seventh diode D7 is provided with a cathode connected to the second input/output pad CA and an anode connected to the ground pad VSS, and is configured to discharge the electrostatic charge to the second input/output pad CA when there is an ESD pulse on the ground pad VSS, so as to form a discharge loop among the ground pad VSS, the second input/output pad CA, and the third power supply pads VDD2H\VDD2HS, thereby improving the capability of ESD protection for the chip.

In one embodiment, the ESD protection network further includes an eighth diode D8 and a ninth diode D9. The eighth diode D8 is provided with an anode connected to the third power supply pads VDD2H\VDD2HS and a cathode connected to the first power supply pads VDD1. The ninth diode D9 is provided with an anode connected to the second power supply pads VDD2L and a cathode connected to the third power supply pads VDD2H\VDD2HS, so as to form the ESD protection network among all the power supply terminals, thereby improving the capability of ESD protection for the chip.

It should be noted that the present disclosure is not limited to the precise structures described above and shown in the accompanying drawings, and can be modified and changed in many ways without departing from the scope of the present disclosure. The scope of the present disclosure is defined by the appended claims.

The invention claimed is:

1. An electrostatic discharge protection network for a chip, wherein the chip comprises a first power supply pad, a second power supply pad, and a ground pad; and the electrostatic discharge protection network comprises:
    a first electrostatic discharge protection circuit, located between the first power supply pad and the ground pad, and configured to discharge an electrostatic charge when there is an electrostatic discharge pulse caused by the electrostatic charge on the first power supply pad;
    a second electrostatic discharge protection circuit, located between the second power supply pad and the ground pad, and configured to discharge an electrostatic charge when there is an electrostatic discharge pulse caused by the electrostatic charge on the second power supply pad; and
    a third electrostatic discharge protection circuit, located between the first power supply pad and the second power supply pad, and configured to provide a discharge path for an electrostatic charge between the first power supply pad and the second power supply pad; and,
    wherein the chip further comprises a third power supply pad and a fourth power supply pad; and the electrostatic discharge protection network further comprises:
    a fourth electrostatic discharge protection circuit, located between the third power supply pad and the ground pad, and configured to discharge an electrostatic charge when there is an electrostatic discharge pulse caused by the electrostatic charge on the third power supply pad;
    a fifth electrostatic discharge protection circuit, located between the fourth power supply pad and the ground pad, and configured to discharge an electrostatic charge when there is an electrostatic discharge pulse caused by the electrostatic charge on the fourth power supply pad; and
    a sixth electrostatic discharge protection circuit, located between the third power supply pad and the fourth power supply pad, and configured to provide a discharge path for an electrostatic charge between the third power supply pad and the fourth power supply pad; and
    wherein the chip further comprises a first input/output pad; and the electrostatic discharge protection network further comprises:
    a seventh electrostatic discharge protection circuit, connected between the first input/output pad and the fourth power supply pad, and configured to discharge an electrostatic charge when there is an electrostatic discharge pulse on the first input/output pad; and
    an eighth electrostatic discharge protection circuit, connected between the first input/output pad and the ground pad, and configured to discharge an electrostatic charge when there is an electrostatic discharge pulse on the ground pad.

2. The electrostatic discharge protection network according to claim 1, wherein the first electrostatic discharge protection circuit comprises:
    a first drive unit, connected between the first power supply pad and the ground pad, and configured to generate a first control signal according to the electrostatic discharge pulse; and
    a first discharge transistor, provided with a first terminal connected to the first power supply pad, a second terminal connected to the ground pad, and a control terminal connected to the first drive unit, and configured to be turned on under a control of the first control signal.

3. The electrostatic discharge protection network according to claim 2, wherein the second electrostatic discharge protection circuit comprises:
    a second drive unit, connected between the second power supply pad and the ground pad, and configured to generate a second control signal according to the electrostatic discharge pulse; and
    a second discharge transistor, provided with a first terminal connected to the second power supply pad, a second terminal connected to the ground pad, and a control terminal connected to the second drive unit, and configured to be turned on under a control of the second control signal.

4. The electrostatic discharge protection network according to claim 3, wherein
    the first drive unit comprises:
    a first capacitor, provided with a first terminal connected to the first power supply pad and a second terminal successively connected to a first terminal of a first resistor and the control terminal of the first discharge transistor; and
    the first resistor, provided with a second terminal connected to the ground pad; and
    the second drive unit comprises:
    a second capacitor, provided with a first terminal connected to the second power supply pad and a second terminal successively connected to a first terminal of a second resistor and the control terminal of the second discharge transistor; and
    the second resistor, provided with a second terminal connected to the ground pad.

5. The electrostatic discharge protection network according to claim 4, wherein
    a capacitance value of the second capacitor is the same as a capacitance value of the first capacitor, a resistance value of the second resistor is the same as a resistance value of the first resistor, a type of the second discharge transistor is the same as a type of the first discharge transistor, and a size of the second discharge transistor is also the same as a size of the first discharge transistor.

6. The electrostatic discharge protection network according to claim 3, wherein the second electrostatic discharge protection circuit further comprises:
    a first diode, provided with an anode connected to the ground pad and a cathode connected to the second power supply pad, and configured to discharge an electrostatic charge when there is an electrostatic discharge pulse on the ground pad.

7. The electrostatic discharge protection network according to claim 1, wherein a voltage of a first power supply terminal connected to the first power supply pad is greater than a voltage of a second power supply terminal connected to the second power supply pad; and the third electrostatic discharge protection circuit comprises: a second diode, provided with an anode connected to the second power supply pad and a cathode connected to the first power supply pad.

8. The electrostatic discharge protection network according to claim 1, wherein the fourth electrostatic discharge protection circuit comprises:
   a third drive unit, connected between the third power supply pad and the ground pad, and configured to generate a third control signal according to the electrostatic discharge pulse; and
   a third discharge transistor, provided with a first terminal connected to the third power supply pad, a second terminal connected to the ground pad, and a control terminal connected to the third drive unit, and configured to be turned on under a control of the third control signal.

9. The electrostatic discharge protection network according to claim 8, wherein the fifth electrostatic discharge protection circuit comprises:
   a fourth drive unit, connected between the fourth power supply pad and the ground pad, and configured to generate a fourth control signal according to the electrostatic discharge pulse; and
   a fourth discharge transistor, provided with a first terminal connected to the fourth power supply pad, a second terminal connected to the ground pad, and a control terminal connected to the fourth drive unit, and configured to be turned on under a control of the fourth control signal.

10. The electrostatic discharge protection network according to claim 9, wherein
    the third drive unit comprises:
    a third capacitor, provided with a first terminal connected to the third power supply pad and a second terminal successively connected to a first terminal of a third resistor and the control terminal of the third discharge transistor; and
    the third resistor, provided with a second terminal connected to the ground pad; and
    the fourth drive unit comprises:
    a fourth capacitor, provided with a first terminal connected to the fourth power supply pad and a second terminal successively connected to a first terminal of a fourth resistor and the control terminal of the fourth discharge transistor; and
    the fourth resistor, provided with a second terminal connected to the ground pad.

11. The electrostatic discharge protection network according to claim 10, wherein
    a capacitance value of the third capacitor is the same as a capacitance value of the fourth capacitor, a resistance value of the third resistor is the same as a resistance value of the fourth resistor, a type of the third discharge transistor is the same as a type of the fourth discharge transistor, and a size of the third discharge transistor is also the same as a size of the fourth discharge transistor.

12. The electrostatic discharge protection network according to claim 1, wherein a voltage of a third power supply terminal connected to the third power supply pad is greater than a voltage of a fourth power supply terminal connected to the fourth power supply pad; and
    the sixth electrostatic discharge protection circuit comprises a third diode provided with an anode connected to the fourth power supply pad and a cathode connected to the third power supply pad.

13. The electrostatic discharge protection network according to claim 1, wherein the chip further comprises a second input/output pad; and the electrostatic discharge protection network further comprises:
    a ninth electrostatic discharge protection circuit, connected between the second input/output pad and the third power supply pad, and configured to discharge an electrostatic charge when there is an electrostatic discharge pulse on the second input/output pad; and
    a tenth electrostatic discharge protection circuit, connected between the second input/output pad and the ground pad, and configured to discharge the electrostatic charge when there is the electrostatic discharge pulse on the ground pad.

14. The electrostatic discharge protection network according to claim 13, wherein
    the seventh electrostatic discharge protection circuit comprises: a fourth diode, provided with an anode connected to the first input/output pad and a cathode connected to the fourth power supply pad;
    the eighth electrostatic discharge protection circuit comprises: a fifth diode, provided with a cathode connected to the first input/output pad and an anode connected to the ground pad;
    the ninth electrostatic discharge protection circuit comprises: a sixth diode, provided with an anode connected to the second input/output pad and a cathode connected to the third power supply pad; and
    the tenth electrostatic discharge protection circuit comprises: a seventh diode, provided with a cathode connected to the second input/output pad and an anode connected to the ground pad.

15. The electrostatic discharge protection network according to claim 1, wherein a voltage of a first power supply terminal is greater than a voltage of a third power supply terminal, the voltage of the third power supply terminal is greater than a voltage of a second power supply terminal, and the voltage of the second power supply terminal is greater than a voltage of a fourth power supply terminal; and
    the electrostatic discharge protection network further comprises:
    an eighth diode, provided with an anode connected to the third power supply pad and a cathode connected to the first power supply pad; and
    a ninth diode, provided with an anode connected to the second power supply pad and a cathode connected to the third power supply pad.

* * * * *